UNITED STATES PATENT OFFICE.

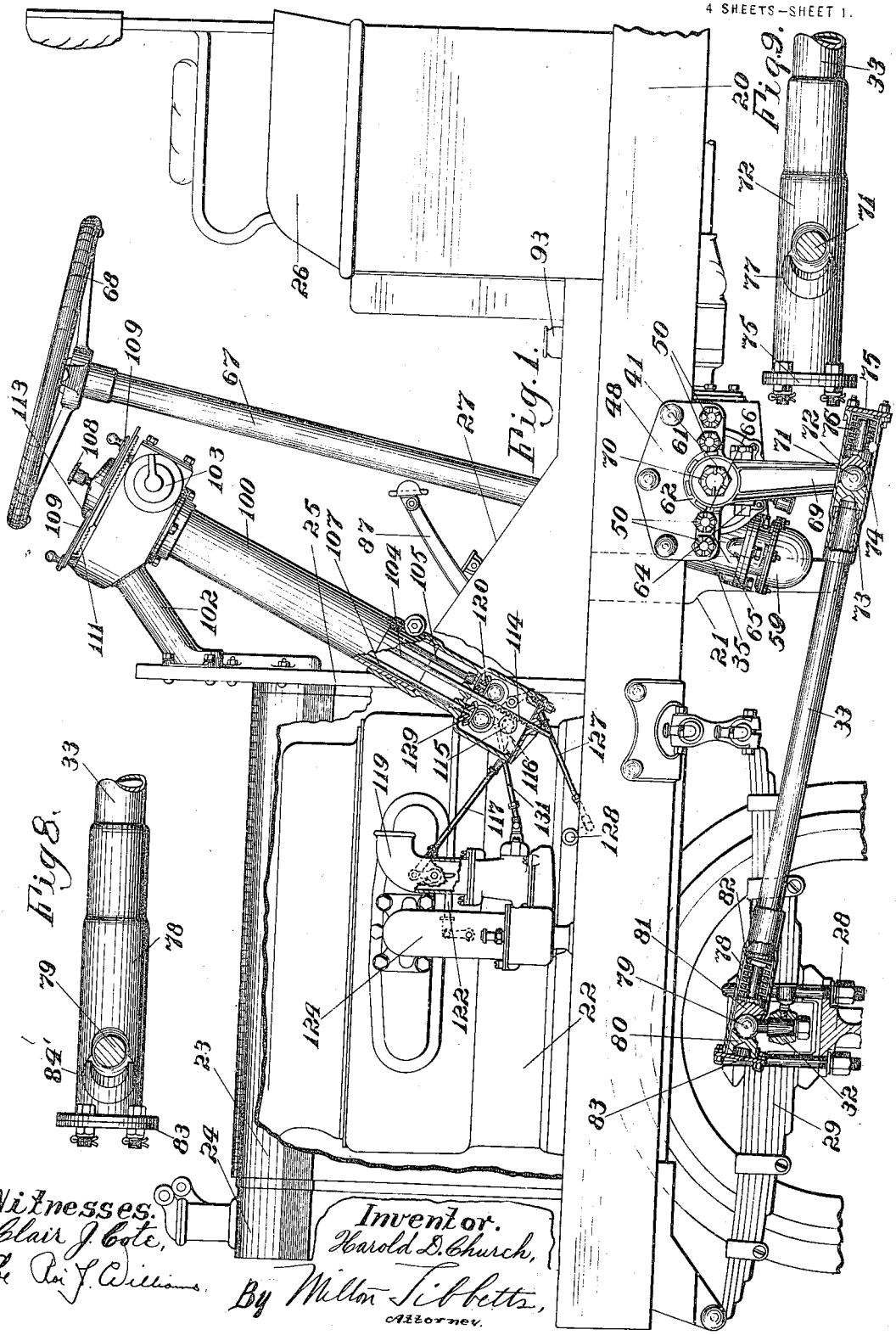

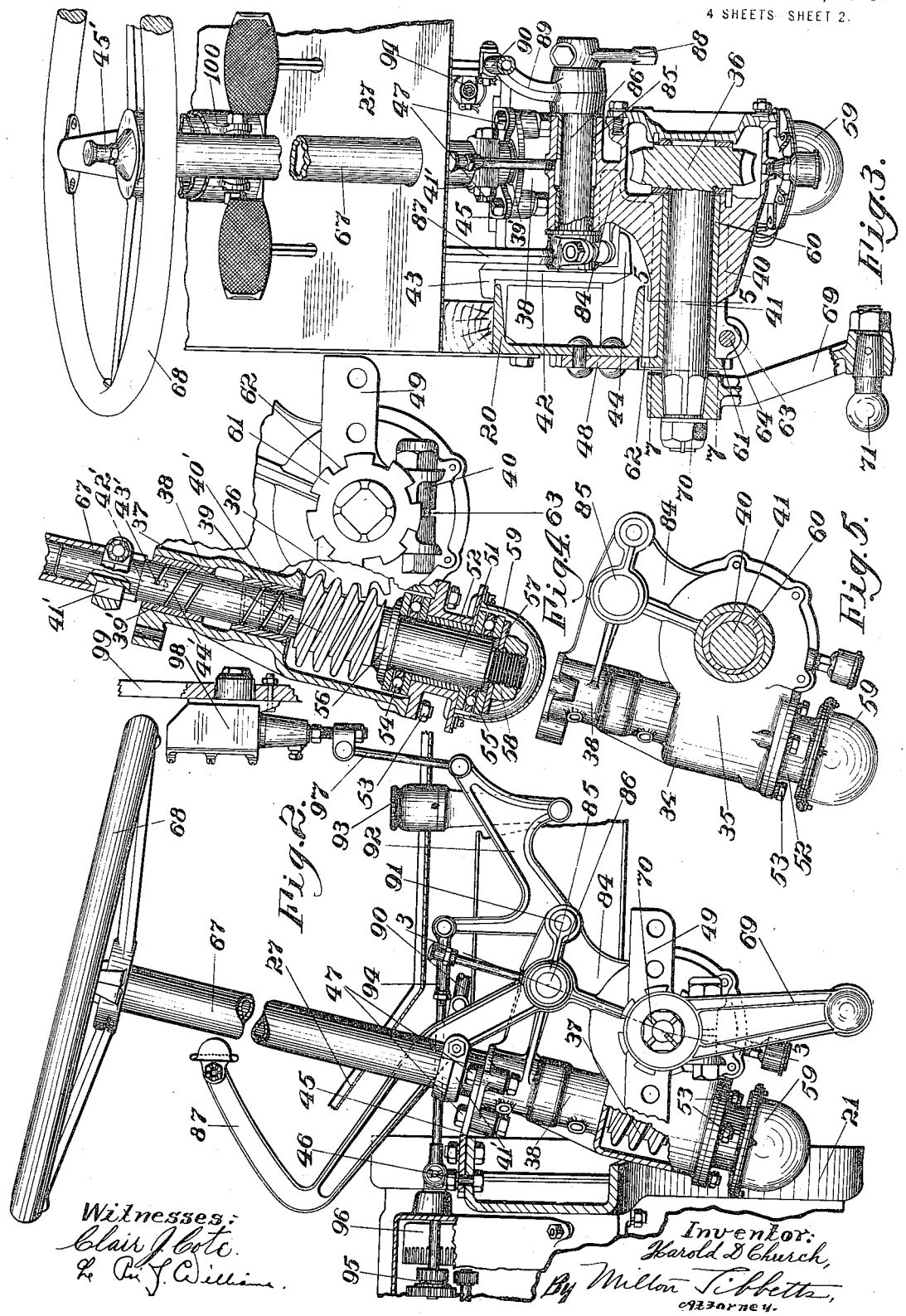

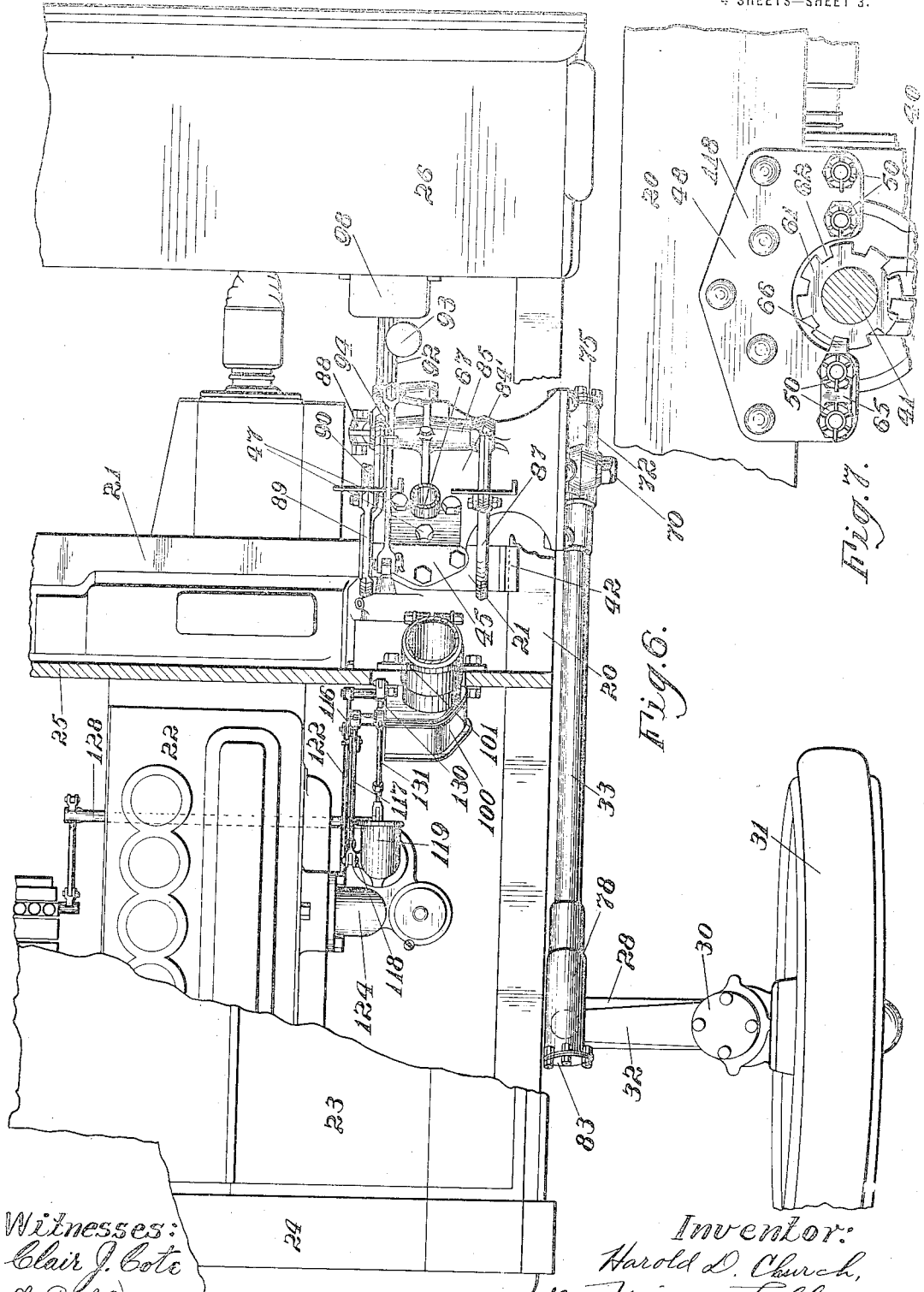

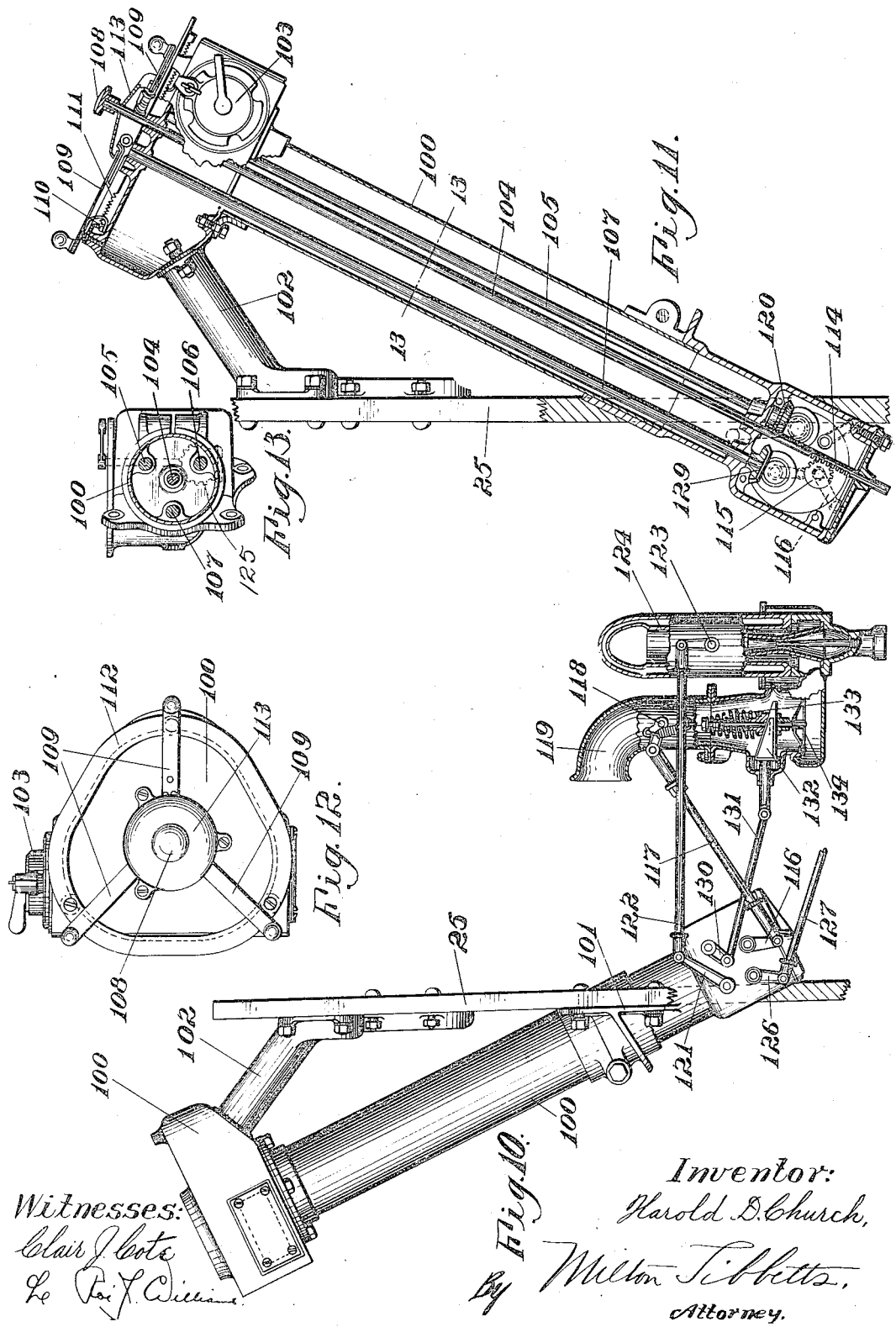

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,293,710.

Specification of Letters Patent.   Patented Feb. 11, 1919.

Application filed May 29, 1915.   Serial No. 31,172.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles and in particular to the control mechanism thereof.

An object of the invention is to provide a vehicle control mechanism, including motor, steering, brake and clutch control, along simple lines, that will facilitate manufacture by decreasing parts and making assembling easier, that will thereby lessen the costs, and at the same time prove to be a superior article to what has gone before.

With a view to attaining this and other objects which will become apparent to those skilled in the art from the following description, my invention consists in the features of construction and arrangement of parts hereinafter more fully described and specified in the claims.

Referring to the drawings, Figure 1 is a left side elevation of a motor vehicle embodying this invention, parts being broken away to show interior construction;

Fig. 2 is a slightly enlarged view showing an elevation and part section of the steering gear casing and associated parts;

Fig. 3 is a transverse section substantially on the line 3—3 of Fig. 2;

Fig. 4 is a vertical sectional view through a part of the steering gear casing, parts being shown in elevation;

Fig. 5 is a side elevation of the steering gear casing showing the adjusting sleeve and rock shaft in section, this section being substantially on the line 5—5 of Fig. 3.

Fig. 6 is a plan view of the vehicle shown in Fig. 1 with parts broken away;

Fig. 7 is a detail elevation of a fragment of one of the frame side members and a supporting bracket for the steering gear casing, the rock shaft of the steering gear being shown in section substantially on the line 7—7 of Fig. 3;

Fig. 8 is an underneath view of the forward end of the steering gear connecting rod;

Fig. 9 is a side view of the rear end of the steering gear connecting rod;

Fig. 10 is an elevation and part sectional view of the casing for the controlling mechanism, the carbureter and intake pipe of the motor, and the various operating connecting rods;

Fig. 11 is a longitudinal sectional view through the casing shown in Fig. 10;

Fig. 12 is a plan view of the casing for the control rods; and

Fig. 13 is a transverse section substantially on the line 13—13 of Fig. 11.

In the drawings, the motor vehicle frame consists principally of the side members 20 and various cross members such as the member 21 shown in Fig. 1. Mounted upon this frame is a motor 22 under the bonnet 23 and between the radiator 24 and the dash 25. The operator's seat is represented at 26, and the floor boards at 27. 28 is the front axle of the vehicle, which is suitably connected with the frame as by springs 29. At the ends of the axle 28 are steering knuckles, one of which is shown at 30 in Fig. 6. On the knuckle spindle is mounted a wheel 31 and an arm 32 is provided for turning the knuckle and thereby steering the wheels and the vehicle. The arm 32 is adapted to be operated by a connecting rod 33 from a steering mechanism mounted on the frame at a suitable point in front of the operator's seat 26. This steering mechanism comprises a casing 34 having a body portion 35 which houses the gears 36 and 37, an upwardly extending portion 38, which forms a bearing for the steering shaft 39, and a laterally extending portion 40, which forms a bearing for the rock shaft 41. The gear 36 is formed upon or secured to the rock shaft 41 and the gear 37 is secured to or formed upon the steering shaft 39.

This steering gear casing 34 is arranged in the angle formed by the left hand side member of the frame and the cross member 21, and it is detachably and rigidly secured to these two frame members. As shown particularly in Figs. 3 and 6, the cross member 21 is suspended from the frame side member 20 by means of a bracket 42 having a lug 43 at its upper end resting upon the frame side member, and a lug 44 at its lower end upon which the cross member 21 rests. What is shown as a stamped steel bracket 45 is rigidly bolted as by bolts 46 to the upper flange of the cross member 21, as shown particularly in Fig. 2, and the upwardly extending part 38 of the steering gear casing 34 is detachably connected to this bracket 45 as by the bolts and nuts 47. Another stamped steel bracket 48 is riveted or otherwise secured to the web of the frame side member 20, as shown particularly in Figs. 1 and 3, and lugs 49 on the laterally extended part 40 of the steering gear casing 34 are detachably connected to this bracket 48 as by the bolts and nuts 50. Thus, the steering gear casing 34 is rigidly and yet detachably secured to the frame of the vehicle.

The body part 35 of the casing 34 is formed with an opening in line with the bearing for the steering shaft 39, and said shaft has an extension 51 passing through the opening. Surrounding this projecting end 51 of the shaft 39 is a bearing supporting piece 52, which is bolted to the casing as at 53. Thrust bearings 54 and 55 are arranged at either side of the bearing support 52, and between abutments 56 and 57, the latter of which is secured on the end 51 of the steering shaft by the nut 58. A cap 59 is secured to the bearing support 52 closing the end thereof and housing the end of the part 51 and the thrust bearing 55. The upper part of the shaft 39 is mounted in bearings 39' and 40', arranged in the part 38 of the steering gear casing 34. The shaft 39 extends upwardly at a slight incline to the vertical and has secured thereto, as by a clamp 41', a tubular part or steering post 67 having a steering wheel 68 mounted at its upper end. It will be noted that the upper part of the shaft 39 has a conduit 42' formed therein and provided with an outlet 43' leading to a spiral groove 44' for lubricating the bearing 39'. In the embodiment of the invention shown, an oil cup 45', communicating with the interior of the tubular part 67, of the steering shaft, is arranged on the top of the part 67. Thus means are provided whereby oil or other suitable lubricants may be fed from a point adjacent the steering wheel 68 through the cup 45' to the interior of the post 67, thence through the conduit 42' to the oil groove 44' and the bearing 39'. The lubricant may then flow downwardly over the bearing 40' and the worm 37 to the bearings 54 and 55 for the lower end 51 of the shaft, thus lubricating these parts from a very convenient and accessible position.

The rock shaft 41 is mounted in a sleeve 60 in the lateral extension 40 of the steering gear casing 34. The interior bore of this sleeve 60 is eccentric to its outer cylindrical surface and the sleeve may be rotated or turned in the part 40 of the casing to thereby position the gear 36 relative to the worm 37. This adjustment is useful in the original assembly of the parts, for taking up wear, and in replacing worn-out gears or parts. The sleeve 60 extends beyond the end of the part 40 of the casing and is formed with a flange 61 having serrations 62 by which the sleeve 60 may be adjusted from the outside of the casing. The outer end of the part 40 is split as shown particularly at 63 in Fig. 3, and a nut and bolt 64 provide for tightening this part around the sleeve 60 after the latter has been adjusted. A positive lock is also provided for the sleeve 60 as shown particularly in Fig. 7. Here it will be seen that the dog 65 has a finger 66 adapted to enter one of the serrations 62 in the flange 61 of the sleeve, and the dog is removably held in place by two of the nuts hereinabove referred to.

The rock shaft 41 of the steering mechanism has an arm 69 keyed to its projecting end and secured thereon by a nut 70 and a ball member 71 is mounted upon the free end of the arm 69 and forms one of the parts of a ball and socket joint connection between the arm 69 and the connecting rod 33 hereinabove described. This ball and socket joint is particularly well shown in Figs. 1 and 9. The enlarged rear end of the connecting rod 33 is shown in section in Fig. 1, and is of tubular form. 72 indicates this tubular part and 73 and 74 indicate socket pieces arranged on either side of the ball member 71. The socket piece 74 has a shank which is adapted to abut against an end cover 75 upon the compression of the spring 76 which is arranged between said socket piece and said cover. It is noted that the ball member 71 is adapted to be inserted into the tubular member 72 through the enlarged part of a key-hole slot 77 in the side of the tube. The contracted neck of the ball member 71 then slides into the narrower part of the key-hole slot and when the cover 75 is in place, the spring 76 and the positive stop 74 prevent the ball member from again reaching the enlarged part of the key-hole slot. It will be noticed that the socket piece 73 forms a rigid connection between the ball member 71 and the tube 33, and thereby transmits compression strains rigidly to the connecting rod. Tensile strains on the rod however, are transmitted yieldingly through the spring 76. Referring to the forward end 78 of the connecting rod, it will be seen that there is a ball and socket connection between this end of the rod and the arm 32 of the steering knuckle, which is slightly different from the ball and socket connection at the rear end of the connecting rod. The ball member 79 is arranged between socket pieces 80 and 81, and a spring 82 forms a cushion or yielding connection between the ball member 79 and the connecting rod 33 when the latter is under compression strains, while the socket member 80 abuts rigidly against the cover 83 and therefore transmits rigidly the tensile strains. The key-hole slot 84' is shown particularly in Fig. 8, and it will be understood that the socket piece 80 being held in place by the cover 83, prevents the ball member 79 from reaching the enlarged part of the key-hole slot after the parts are properly assembled.

From the above, it will be observed that the connecting rod 33 has a spring means at one end for yieldingly transferring the compression strains, and a similar means at the other end for yieldingly transmitting the tensile strains. And in both cases a keyhole slotted tubular part is used and positive means in addition to spring means are provided for preventing the ball member from accidentally reaching the enlarged part of the key-hole slot.

Returning again to the steering gear casing 34, it will be seen that because of the rigid mounting of the casing on the vehicle frame, it is used for supporting the clutch, brake, and other pedals or levers. Thus an extension 84 forms a bearing 85 for a shaft 86 to which is keyed the clutch pedal 87, and an arm 88 which is connected to the clutch, not shown. Mounted to oscillate upon the shaft 86 is a brake pedal 89, having a connecting rod 90 for operating the vehicle brakes, not shown. Also mounted upon the extension 84, as at 91, is a bell crank lever 92 which may be operated by a pedal 93 and connected by a link 94 with starting gears 95 adapted to connect a suitable starting motor with the fly-wheel 96 of the vehicle motor, and a connecting rod 97 connected to a switch 98 of any suitable form for starting the starting motor. The switch 98 is shown as mounted on the heel-board 99 of the operator's seat 26.

For the purpose of mounting the hand control mechanism of the vehicle convenient for operation by the driver, a casing 100 of elongated shape is shown as mounted on the vehicle dash 25. At its lower end, the casing is formed with a flange 101 which is secured to the dash, and at its upper end there is a tubular extension 102 which is connected to the dash 25 at the top thereof. Thus the casing for the operating mechanism is rigidly secured and braced to the dash, and it will be noticed that the upper end of the casing 100 is directly beneath the steering wheel 68 and therefore convenient for the operator, and the lower end extends through the dash 25 and is therefore adjacent the motor where the various operating devices may be conveniently connected to the motor control parts.

The upper part of the casing 100 is enlarged and supports the coil and switch 103 for controlling the ignition of the motor. It also supports four control rods, 104, 105, 106 and 107, the rod 104 being a reciprocating rod and the other three rods being arranged to oscillate. All of these rods extend upwardly through the upper wall of the enlarged part of the casing 101 and the rod 104 is provided with a button 108, by which it may be operated. The other three rods are arranged symmetrically about the rod 104, and each is provided with an operating handle or lever 109. By means of these levers 109, the rods 105, 106 and 107 may respectively be operated and they are retained in adjusted position by a finger 110 on each of the levers engaging in suitable notches 111 on a guide 112. A cap 113 covers the ends of all of the rods except rod 104 which projects through it, and this cap is removably secured to the casing and has side openings for each of the levers 109.

The lower ends of these controlling rods are mounted in suitable bearings in the lower part of the casing 100 and the rod 104 is provided with rack teeth 114 meshing with a gear 115 operating an arm 116 connected to a link 117, which opens and closes a butterfly valve 118 in the main air intake 119 of the motor carbureter. The rod 105 is connected through bevel gears 120, arm 121 and link 122 with the throttle valve 123 in the motor intake pipe 124. The rod 106 is connected through bevel gears 125, arm 126, link 127, and rock shaft 128 with the spark advance mechanism of the motor, which is not shown. The rod 107 is connected through bevel gears 129, arm 130, and link 131, with a wedge 132 for adjusting the tension of the spring 133 on the carbureter air valve 134.

The form of the invention herein shown is illustrative only, and while I have described in some detail a specific embodiment of my invention which I deem to be new and advantageous and will specifically claim, yet I do not desire to be understood that my invention is limited to the exact details of construction as it will be apparent that changes may be made therein without departing from the spirit or scope of the invention.

Having thus described my invention, what I claim and desire to secure by Letters Patent is:—

1. In a motor vehicle having a chassis frame, the combination of a steering-gear-casing affixed to said frame, and clutch-controlling means carried by and secured to said casing.

2. In a motor vehicle having a chassis frame, the combination of a steering-gear-casing affixed to said frame, and clutch-controlling means and brake-controlling means carried by and secured to said casing.

3. In a motor vehicle having a chassis frame, the combination of a steering-gear-casing affixed to said frame, a shaft carried by said casing, and a clutch-controlling-lever and a brake-controlling-lever carried by said shaft.

4. In a motor vehicle having a chassis frame, the combination of a steering-gear-casing affixed to said frame, and a clutch-controlling pedal and a brake controlling pedal carried by said casing, and arranged to swing about a common axis.

5. In a steering gear, the combination of the casing having a cylindrical part for housing the worm gear, said part having an open end, a steering shaft having a worm gear mounted in said casing and having its end projecting through said open end, a bearing support surrounding said projecting end and secured to said casing, thrust bearings at either side of said support for said steering shaft, and a cap over the end of said shaft and secured to said support.

6. In a motor vehicle, the combination of the frame, a steering gear casing, gears therein, means for adjusting one of said gears relative to another, said means extending to a point outside of said casing, a bracket connecting said casing to the frame, and means on said bracket for securing said adjusting means in adjusted position.

7. In a motor vehicle, the combination of the frame, a steering gear casing, a steering shaft entering the casing, a rock shaft entering the casing, gearing in the casing connecting said shafts, and connections from the casing to the vehicle frame at points on the casing adjacent where said shafts enter, respectively.

8. In a motor vehicle, the combination of the frame, a steering gear casing, comprising a body part for housing the gears, an upwardly extending part for supporting the steering shaft, and a laterally extending part for supporting the rock shaft, and connections from said upwardly and laterally extending parts respectively to the frame for supporting the casing therefrom.

9. In a motor vehicle, the combination of frame side members and a cross member, a steering gear casing, and brackets from said casing to one of the side members and to said cross member, respectively.

10. In a motor vehicle, the combination of frame side members and a cross member, a steering gear casing, brackets on one of the side members and the cross member, respectively, and detachable connecting means for said casing to said brackets.

11. In a motor vehicle, the combination of frame side members and a cross member, a steering gear casing, a steering shaft entering the casing, a rock shaft entering the casing, gearing in the casing connecting said shafts, a bracket on the side member connected to the casing adjacent the point where the rock shaft enters, and a bracket on the cross member connected to the casing adjacent the point where the steering shaft enters.

12. In a steering gear, the combination of a casing, a steering shaft, having a worm gear thereon, a rock shaft having a worm wheel to mesh with said gear, an arm on said rock shaft outside of the casing, and an eccentrically mounted bearing sleeve for said rock shaft forming the sole support therefor, and extending to an accessible position outside of the casing.

13. In a steering gear, the combination of a casing, a steering shaft, having a worm gear thereon, a rock shaft having a worm wheel to mesh with said gear, an arm on said rock shaft outside of the casing, and a bearing sleeve wholly supporting said rock shaft at one side of its worm wheel and mounted eccentrically in the casing, said sleeve extending to the outside of the casing and having means at its outer end for adjusting and holding it in the casing.

14. In a motor vehicle having a chassis frame, and a floor-board above the latter, the combination of a steering-gear-casing affixed to said frame, and a control pedal extrinsic to the steering mechanism but carried by said casing and connected to the latter below said floor-board.

15. In a motor vehicle having a chassis frame, and a floor-board above the latter, the combination of a steering-gear-casing affixed to said frame, a rockshaft carried by said casing and arranged beneath said floor-board, and two control-pedals mounted on said rockshaft, one of said pedals being tight, and the other being loose, relatively to said rockshaft.

16. In a motor vehicle having a chassis frame, the combination of a steering-gear-casing affixed to said frame, and two control-pedals carried by said casing and arranged at opposite sides of the latter, said pedals being movable independently of each other to control the vehicle otherwise than to steer it.

17. In a steering gear, in combination, a gear-casing, a worm arranged therein, and a steering shaft coupled to said worm and extending above said casing, said casing and said shaft having coöperative bearing surfaces, said shaft having an internal oil duct extending longitudinally thereof, the lower end of said duct being above said worm and having an outlet against a bearing surface of said casing, one of said surfaces having a groove arranged to conduct oil downwardly between said outlet and said worm.

In testimony whereof I affix my signature in the presence of two witnesses.

HAROLD D. CHURCH.

Witnesses:
Le Roi J. Williams,
Claio J. Coté.